United States Patent [19]
Yokoi et al.

[11] Patent Number: 5,128,285
[45] Date of Patent: * Jul. 7, 1992

[54] SILICON OXYNITRIDE SINTERED BODY

[75] Inventors: Hitoshi Yokoi, Ama; Satoshi Iio, Konan; Masakazu Watanabe, Nagoya, all of Japan

[73] Assignee: NGK Spark Plug Co., Ltd., Nagoya, Japan

[*] Notice: The portion of the term of this patent subsequent to Sep. 11, 2007 has been disclaimed.

[21] Appl. No.: 335,844

[22] Filed: Apr. 10, 1989

[30] Foreign Application Priority Data

Apr. 14, 1988 [JP] Japan ................... 63-92193
Apr. 22, 1988 [JP] Japan ................... 63-100868

[51] Int. Cl.$^5$ ........................... C04B 35/58
[52] U.S. Cl. ........................... 501/95; 501/92; 501/97; 501/98
[58] Field of Search ............ 501/89, 92, 95, 97, 501/98

[56] References Cited

U.S. PATENT DOCUMENTS

| | | | |
|---|---|---|---|
| 3,833,389 | 9/1974 | Komeya et al. | 501/92 |
| 4,102,698 | 7/1978 | Lange et al. | 106/65 |
| 4,234,343 | 11/1980 | Andersson | 106/73.2 |
| 4,401,768 | 8/1983 | Morgan | 501/98 |
| 4,501,723 | 2/1985 | Ezis et al. | 501/97 X |
| 4,506,021 | 3/1985 | Jack et al. | 501/98 |
| 4,789,277 | 12/1988 | Rhodes et al. | 501/89 X |
| 4,795,724 | 1/1989 | Soma et al. | 501/98 |
| 4,801,564 | 1/1989 | Baba | 501/95 X |

FOREIGN PATENT DOCUMENTS 62-223066 11/1987 Japan ................... 35/58

OTHER PUBLICATIONS

M. Ohashi et al., "Mechanical Properties of Hot-Pressed Silicon Oxynitride Ceramics", Paper No. 3A25, Yogyo Kyokai Nenkai Yokoshu, 1987.
M. Mitomo et al., (Reprint of the 25th Ceramic Fundamental Forum), Paper No. 1A18, Yogyo Kiso Toronkai Koen Yoshi Shu, 1987.
Lewis et al., "Pressureless-sintered Ceramics Based on the Compound $Si_2N_2O$", Materials Science and Engineering, 71. pp. 87-94, 1985.

Primary Examiner—Karl Group
Attorney, Agent, or Firm—Fish & Richardson

[57] ABSTRACT

Silicon oxynitride sintered body is obtained by sintering a base starting material mixture comprising silicon oxynitride component and a solution of at least one alkoxide selected from alkoxides of at least one element selected from the group consisting of Al, Sc, Y and rare-earth elements.

Fiber-reinforced ceramic sintered body is obtained by sintering the base starting material mixture further including 5-40% by weight of SiC whiskers and/or $\beta$-$Si_3N_4$ whiskers, wherein alkoxide component is 0.5-30% by weight as oxides.

The alkoxide component is deposited on the other material powders and calcined to provide well dispersed oxide layer on the powder surface which forms uniform matrix phase giving high density by sintering. Sintered bodies (with or without whiskers) have low deterioration at high temperatures.

18 Claims, 1 Drawing Sheet

SILICON OXYNITRIDE SINTERED BODY

FIELD OF THE INVENTION

This invention relates to a silicon oxynitride ($Si_2N_2O$) sintered body which has a high strength and is excellent in heat resistance and oxidation resistance, and a fiber-reinforced ceramics reinforced by whiskers which contains silicon oxynitride ($Si_2N_2O$) as a major constituent, and a method for producing the same.

BACKGROUND

Recently, ceramic materials are being sought which have high strength and toughness and are excellent in wear resistance, chipping resistance, oxidation resistance and heat resistance, and which are used for cutting tools, automobile engine parts such as ceramic valves and the like, and heat engine parts such as gas turbine rotors and the like.

As a ceramic material which is excellent in heat resistance and oxidation resistance, silicon oxynitride ($Si_2N_2O$) is known.

As is seen in Yogyo Kyokai Nenkai Yokoshu 1987 (Preprint of the 1987 Annual Meeting of the Ceramic Society of Japan) 3A25 or 25th Yogyo Kiso Toronkai Koen Yoshi Shu (Preprint of the 25th Ceramic Fundamental Forum) 1A18, silicon oxynitride is generally produced adding a metal oxide powder to $Si_3N_4$ and $SiO_2$ as a sintering aid and sintering the resultant mixture.

Due to the addition of the sintering aid, a liquid phase is produced during sintering, and the reaction $Si_3N_4 + SiO_2 \rightarrow 2Si_2N_2O$ which is extremely difficult to proceed in a solid phase is promoted. The sintering of $Si_2N_2O$ which is difficult to be sintered is also promoted by this liquid phase.

PROBLEMS TO BE SOLVED BY THE PRESENT INVENTION

The added sintering aid described above mainly exists, however, as a glass phase in the sintered body.

Accordingly, although the addition of a large amount of the sintering aid improves sinterability such as densification and the like, it causes a decrease in high-temperature characteristics of the sintered bodies obtained.

In order to improve sinterability, it is also known to use a sintering aid which has a particle size as small as possible, that is, which has a large specific surface area and an excellent reactivity, or uniformly disperse a sintering aid in a raw material.

In the prior art, however, since a starting material comprised of a metal oxide powder which is a sintering aid, $Si_3N_4$ powder and $SiO_2$ powder is pulverized and mixed by a mechanical means such as a ball mill and the like as described above, it is difficult to completely satisfy the above-described conditions.

That is, in the above-described pulverization and mixing by a mechanical means such as a ball mill and the like, there are problems that 1) a limit exists in decreasing the particle size of the sintering aid,
2) a satisfactory uniform mixing is difficult,
3) a long period of time is required for the pulverization and mixing,
4) impurities are easily mixed from a mixer and the like due to the pulverization and mixing for a long period of time, and the like.

Moreover, although silicon oxinitride sintered bodies have sufficient properties relative to the heat resistance, oxidation resistance and strength as described above, they are insufficient in the toughness.

SUMMARY OF THE DISCLOSURE

It is an object of the present invention to provide a novel fiber-reinforced ceramics which secures a sufficient sinterability even by a small amount of sintering aid and also has a high toughness.

It is another object of the present invention to provide a novel ceramics which can be used as a base (or matrix) sintered body for said novel fiber-reinforced ceramics.

It is a further object of the present invention to provide a method for producing said novel fiber-reinforced ceramics and said novel ceramics as a matrix thereof.

Still further objects will become apparent in the entire disclosure.

The present invention achieves the above-described objectives by the following approaches.

According to a first aspect of the present invention, there is provided a silicon oxinitride sintered body obtained by sintering a starting material mixture comprising:

a solution of at least one alkoxide selected from alkoxides of at least one element selected from the group consisting of Al, Sc, Y and rare-earth elements; and silicon oxynitride component.

This sintered body has $Si_2N_2O$ grains as a major phase (generally isolated), and uniformly dispersed oxide phases derived from the alkoxides as a bond matrix. In a preferred embodiment, the bond matrix forms a continuous network which is uniformly developed and has no segregation or agglomeration. The oxide phase derived from the alkoxides serves as a sintering aid during the sintering procedure. This sintered body is characterized by its uniform and dense microstructure, the Weibull Modulus being 20 or higher (measured on 20 or more samples). Also this sintered body is characterized by low strength deterioration at high temperatures (20% or less decrease at 1200° C. from the room temperature strength).

According to a second aspect of the present invention, there is provided a method of producing a silicon oxynitride sintered body which comprises the following steps. The method comprises:

preparing a mixture comprising a solution of at least one alkoxide selected from alkoxides of at least one element selected from the group consisting of Al, Sc, Y and rare-earth elements, and powdery silicon oxynitride component;

depositing components including said elements on the powdery silicon oxynitride component from the alkoxides in the mixture;

calcining the resultant powder mixture; and sintering the calcined product at a temperature and for a period of time which are sufficient to reach a predetermined high density.

The amount of the alkoxides converted into oxides of the metallic elements may be 0.1–30% by weight, and more preferably 0.1–20% by weight from a viewpoint of obtaining dense sintered bodies having excellent properties. It should be noted here that a less amount of the sintering aid (derived from alkoxides) than the conventional case is sufficient to provide desired density and strength due to its uniformity of the distribution in the sintered body.

According to a third aspect of the present invention, there is provided a fiber-reinforced ceramic sintered body obtained by sintering a starting material comprises:

(a) at least one of SiC whiskers and β-type $Si_3N_4$ whiskers;

(b) a solution of at least one alkoxide selected from alkoxides of at least one element selected from the group consisting of Al, Sc, Y and rare-earth elements; and (c) silicon oxynitride component, wherein (a) component is 5–40% by weight, (b) component is 0.5–30% by weight converted into oxides of said elements, and the balance is (c) component ($\geqq 30\%$ by weight).

The (c) component may have the identical composition as that in the first aspect.

Fiber-reinforced ceramics having little high-temperature deterioration can be obtained by using the silicon oxynitride component (c) either in the case of single $Si_2N_2O$ or in the case of a mixed system of $Si_3N_4$ and $SiO_2$.

The density of fiber-reinforced ceramics using whiskers is not less than 98%, preferably not less than 99%, and reaches a value not less than 99.5% at the maximum, respectively, in terms of the relative density (percent) of the theoretical density.

According to a fourth aspect of the present invention, there is provided a method of producing a fiber-reinforced ceramics which comprises the following steps. The method comprises:

preparing a mixture comprising:

(a) at least one of SiC whiskers and β-type $Si_3N_4$ whiskers, (b) a solution of at least one alkoxide selected from alkoxides of at least one element selected from the group consisting of Al, Sc, Y, and rare-earth elements, and wherein (a) component is 5–40% by weight, (b) component is 0.5–30% by weight, converted into oxides of said elements and the balance is (c) component;

depositing components including said elements on the powdery silicon oxynitride component from the alkoxide in said mixture;

calcining the resultant powder mixture; and sintering the calcined product at a temperature and for a period of time which are sufficient to reach a predetermined high density.

In the third aspect, the compositional ratio of the base ceramic body exclusive of the whiskers (a) is similar to that in the first aspect, whereas a little higher amount of the alkoxide is preferred to provide good sinterability with the whiskers. The uniformity is indexed by high Weibull Modulus of 20 or more. The $Si_2N_2O$ phase is predominant in the matrix phase of the fiber-reinforced sintered body.

In the second and fourth aspects, a hydrolysis step may be included after the deposition step. Although a drying step is usually included before the calcination, the drying step may sometimes be simultaneously performed at the calcination step.

The term "dense" or "predetermined high density" herein denotes a relative density of at least 98% of the theoretical density. The term "rare-earth elements" denotes lanthanoid elements La (atomic number 57) through Lu (atomic number 71).

The present invention will be hereinafter explained in detail with reference to the drawings.

EFFECTS OF THE INVENTION

Figure 1:
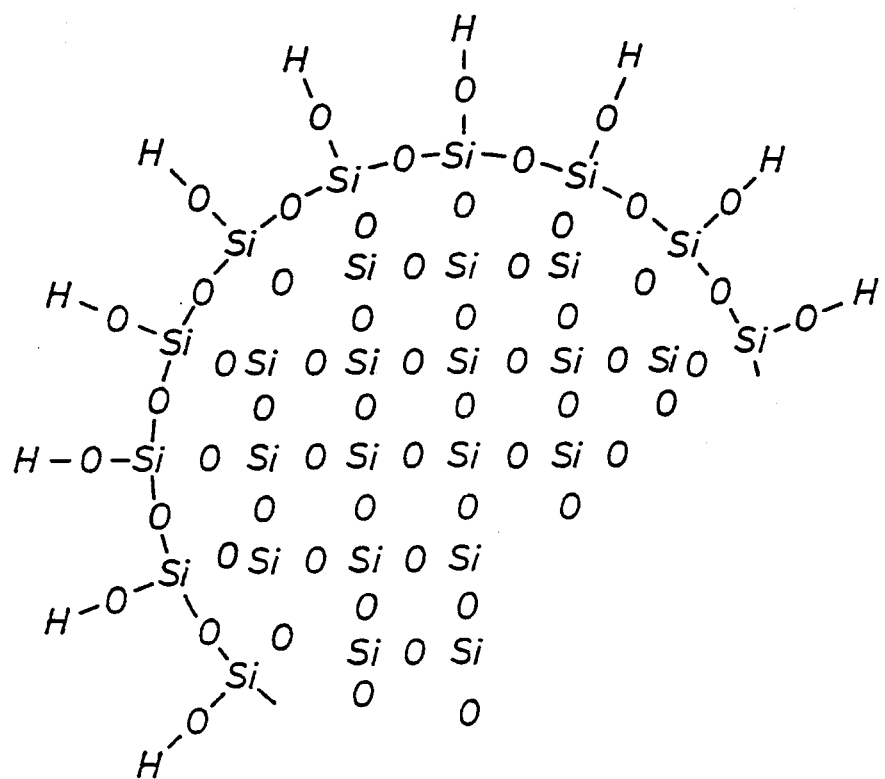
FIGS. 1 and 2 are schematic representations indicating the functions of metal alkoxides.

Hydroxyl radicals (—OH radicals) are generally bonded on the surface of $Si_3N_4$, $SiO_2$ or $Si_2N_2O$. The bonded state is shown in a model in FIG. 1 for the case of $SiO_2$ particles.

Figure 2:
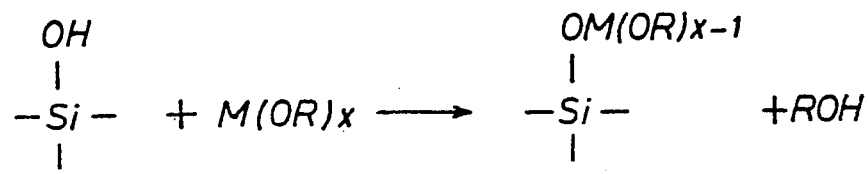

When $Si_3N_4$, $SiO_2$ or $Si_2N_2O$, which is/are the silicon oxynitride component(s) of the starting material of the present invention, and an alkoxide solution is mixed, hydroxyl radicals on the surface of each particle react with the above-described metal alkoxide M(OR), forming —OM(OR)$_{x-1}$ radicals around each particle. This state is shown in a schematic representation in FIG. 2 for the case of $SiO_2$ particles.

By means of directly drying and calcining, or drying and calcining after performing hydrolysis, the above-described $Si_3N_4$, $SiO_2$ or $Si_2N_2O$ having reacted with the alkoxide, fine particles of the metal oxide included in the alkoxide uniformly adhere onto the surfaces of all the starting material particles.

The fine particles of the metal oxide (sintering aid) thus adhered on the surfaces of the starting material particles are very fine and uniformly dispersed. It is impossible to obtain such fine particles and uniform dispersion of the powdery metal oxides by mechanical means.

Consequently, it is possible to obtain highly reliable sintered bodies having no internal defects and the like even if the added amount of the sintering aid is less than that in the prior art. It is also possible to reduce produced amounts of a glass phase or second and third phases having low melting points in a sintered body caused by the sintering aid, and obtain sintered bodies without deterioration in properties at high temperatures.

In general, $Si_2N_2O$ is rapidly decomposed by the reaction $3Si_2N_2O \rightarrow Si_3N_4 + 3SiO + N_2$ at a temperature exceeding 1700° C.

In the third and fourth aspects of the present invention, however, since the whisker component suppresses the decomposition of $Si_2N_2O$ during sintering, and the fine-particle sintering aid which is uniformly dispersed due to alkoxides as described above promotes the sintering of $Si_2N_2O$, it is possible to obtain fiber-reinforced sintered bodies which are sufficiently dense.

Fiber-reinforced ceramics of the present invention have high toughness due to crack deflection and pullout effects of SiC whiskers and/or β-type $Si_3N_4$ present in the sintered bodies.

The pullout effect is an effect which remarkably decreases a stress concentration at the front end of a crack and improves toughness, caused by whiskers being pulled out from a matrix in a stress field at the front end of the crack generated in the matrix.

Furthermore, in the fiber-reinforced ceramics of the present invention, grain growth of silicon oxynitride during the sintering is suppressed due to the presence of whiskers, and it is possible to obtain sintered bodies having a high strength.

According to the above-described configuration, the present invention makes possible to provide a ceramic material which has high strength and toughness, and is excellent in the wear resistance, chipping resistance, oxidation resistance, heat resestance, and corrosion resistance.

Although it is already well known that the toughness of alumina, mullite and the like are improved by the addition of SiC whiskers, the addition of SiC whiskers does not necessarily improve the toughness of ceramics. For instance, even if SiC whiskers are added to $Si_3N_4$ which has a similar composition as that of the materials of the present invention, only a small extent of improvement in toughness is obserbed, and remarkable improvement in toughness as in the present invention can not be obserbed.

DESCRIPTION OF THE PREFERRED EMBODIMENTS

In the present invention, alkoxides of Al, Sc, Y and rare-earth elements prepared as a solution are used as a starting material.

The alkoxide $(M(OR)_x)$ is a compound in which hydrogen in a hydroxyl radical of alcohol is replaced by a metal M.

Various kinds of alcohols may be used for producing alkoxides used in the present invention.

Especially, alkoxides using so-called lower alcohols of C1-C4 grades, such as methanol, ethanol, iso-propanol, tert-butanol and the like, are desirable since they have high stability and high solubility to solvents.

The alkoxides are mixed with other raw materials in the state of a solution solved in a solvent. As solvents used in this case, tetrahydrofuran ($C_4H_8O$), methanol ($C_2H_5OH$), iso-propanol ($CH_3CH(OH)CH_3$) and the like which have high solubiltiy for alkoxides and can be mixed with water at an arbitrary ratio are desirable.

When the amount of at least one kind of alkoxides selected from the group consisting of Al, Sc, Y and rare-earth elements is less than 0.1% by weight (without whisker) or 0.5% by weight (with whisker) converted into oxides, sinterability is inferior and it is difficult to obtain a desired fiber-reinforced sintered body.

On the other hand, when the alkoxides exceed 30% by weight converted into oxides, a glass component within the sintered body becomes too much, and a decrease in properties, such as strength, heat resistance and oxidation resistance, is observed. The amount of alkoxides is preferably 20% by weight or less (with or without whiskers).

The silicon oxinitride component is a component (or components) which forms $Si_2N_2O$ grains after sintering, and a mixture of $Si_3N_4$ powder and $SiC_2$ powder mixed in a predetermined ratio, $Si_2N_2O$ powder or a mixture of these powders may be used.

Although general, commercially available $Si_3N_4$, $SiO_2$, $Si_2N_2O$ powders may be used in the embodiments, it is desirable to use powders as pure and as fine as possible from a viewpoint of obtaining dense sintered bodies. An average powder particle size of 2 μm or less is good (preferably 1.5 μm or less).

Furthermore, when a part of or the entire fine $SiO_2$ powder (e.g., no larger than 0.1 μm) is replaced by a colloidal silica (silica sol) in a dispersion medium such as ethanol, iso-propanol or the like, the raw material powder does not fly about, and so the processability is ameliorated. The use of colloidal silica is preferable, since handling becomes easier, and extremely fine oxides produced from metal alkoxides become easily adhered or adsorbed on thus produced fine $SiO_2$ surface.

When $Si_3N_4$ powder and $SiO_2$ powder are used the mixing ratio may be about 1.4:1.0 to 1.0:1.2, and more preferably within the ratio of $Si_3N_4:SiO_2 = 1.2:1.0$ to 1.0:1.2, both in molar ratio from a viewpoint of obtaining sintered bodies which are dense and excellent in high-temperature properties.

Essentially the total sum of raw material components (alkoxides and silicon oxinitride components or further whiskers) makes up 100% by weight.

In the second aspect of the present invention, silicon oxinitride sintered bodies are produced from a starting raw material comprised of the above-described alkoxides and silicon oxinitride component(s) (and whiskers in the fourth aspect, for example, in the following way.

A solution of alkoxides of Al, Sc, Y and rare-earth elements is prepared by a water-insoluble or water-soluble solvent, such as tetrahydrofuran, methanol, iso-propanol or the like. The water-soluble solvent is used if hydrolysis is employed.

Silicon oxinitride component powder(s) (or, in addition, whiskers) is(are) added to the above-described alkoxide solution, sufficiently mixed and stirred, and then dried, and further calcined at 100°-1000° C. to obtain a raw material formulation.

Alternatively, silicon oxinitride component powders (or, in addition, whiskers) may be added to the above-described alkoxide solution, mixed and stirred, and then subjected to hydrolysis to provide a mixture of the above-described metal hydroxide and silicon oxinitride component powders (or, in addition, whiskers), which may be dried, and then calcined at 100°-1000° C. to obtain a raw material formulation.

Furthermore, in the adjustment of the above-described raw material formulation, when $SiO_2$ powder is used as a part of the silicon oxinitride component, a colloidal silica (silica sol) in a dispersion medium which can be mixed with the alkoxide solution may be also used to obtain a raw material formulation.

Although drying, at the preparation of the above-described raw material formulation, may be performed by evaporation while stirring, spray drying is desirable in order to improve flowability of the raw material formulation powder. It is also possible to simultaneously perform drying and calcination by means of spray pyrolysis or flame spraying.

Silicon oxynitride sintered bodies are then produced by sintering the raw material formulation powder obtained as described above by means of hot pressing, gas-pressure sintering, HIP and the like, generally, in a non-oxidizing atmosphere.

When Al is selected as an alkoxide metal, a solid solution of a part of or the entire $Al_2O_3$ may be formed within $Si_2N_2O$ of the sintered body obtained to form $Si_{2-x}Al_xO_{1+x}N_{2-x}$ (O'-sialon). Crystal phases of $Si_3N_4$, $Y_2Si_2O_7$ and the like may also be included to an extent that they do not give bad influences on properties of sintered bodies.

As the whiskers used in the third and fourth aspects of the present invention, SiC whiskers and/or β-type $Si_3N_4$ whiskers are used. Commercially available whiskers may be used as these whiskers.

A typical shape of the above-described whiskers is 0.2-5 μm less than average diameter and 2-200 μm in average length. A whisker length roughly of 5-80 μm may be successfully employed for fine distribution.

Especially, whisker-like crystals which include only a small amount of impurities such as cationic ingredients such as Al, Fe, Cr, Co, Mn and the like, melillite ($Si_3N$-

4·Y$_2$O$_3$) and the like and fewer neckings, branchings, surface defects and the like, are preferable.

There exist α-type and β-type Si$_3$N$_4$ whiskers. The α-type Si$_3$N$_4$ whiskers are transformed into the β-type through dissolution and deposition during the sintering, and do not exist in the form of whiskers within the sintered bodies. Hence, the α-type Si$_3$N$_4$ whiskers can not be used.

The whiskers on the surfaces of which a coating processing of BN, carbon or the like is performed may also be used.

When the whisker component is less than 5% by weight, there is little improvement in toughness due to the whisker component, and the function of suppressing the decomposition of Si$_2$N$_2$O during sintering is insufficient.

On the other hand, when the whisker component exceeds 40% by weight, the sinterability becomes insufficient to obtain a desired fiber-reinforced sintered body. Considering the deterioration of strength at high temperatures (1200° C. or above), the content of the whisker component is preferably 10–40% by weight, and more preferably 18–40% by weight.

The decrease in the flexural strength at high temperatures from the room temperature strength is maintained at most 20% or less, preferably 10% or less, or most preferably 7% or less, measured at 1200 ° C. according to the present invention. High flexural strength at 1200 ° C. is obtainable, e.g., 60–81 kgf/mm$^2$ or more (without whiskers), or 63–91 kgf/mm$^2$ or more (with whiskers).

The flexural strength at the room temperature of the inventive products (with or without whiskers) generally amounts to at least 65 kgf/cm$^2$, and preferably at least 70 kgf/cm$^2$, most preferably at least 75 kgf/cm$^2$.

The fracture toughness at the sintered bodies (without whisker reinforcement) amounts to at least 2.5 MN/m$^{3/2}$ and preferably 3.0 MN/m$^{3/2}$ or more, most preferably 3.5 MN/m$^{3/2}$ or more. The fiber-reinforced sintered bodies have still higher fracture toughness of at least 6 MN/m$^{3/2}$ and preferably 7 MN/m$^{3/2}$ or more, most preferably 8 MN/m$^{3/2}$ or more.

The hardness in terms of Vickers hardness Hv amounts to at least 1450 kgf/mm$^2$ and preferably 1500 kgf/mm$^2$ or more, most preferably 1550 kgf/mm$^2$ or more for the sintered bodies without whiskers. For the fiber-reinforced sintered bodies it amounts to at least 1650 kgf/mm$^2$ and preferably 1700 kgf/mm$^2$ or more, most preferably 1750 kgf/mm$^2$ or more.

The densities of the sintered bodies obtainable by the present invention amount to a relative density at least 98% of the theoretical density, and preferably 99% or more, most preferably 99.5% or more.

As for the method of producing the sintered bodies, the calcination may be done for a period of time sufficient to fully decompose the alkoxides at the temperature range already mentioned. The sintering may be done at a temperature range 1600°–2000 ° C., (with or without whiskers) for a period of time sufficient to densify the mass, e.g., 0.5 hour or more, and preferably 1700°–1800 ° C., most preferably 1750°–1850 ° C. The atmosphere in which the sintering is conducted should be nonoxidizing atmosphere, and preferably nytrogen including atmosphere, most preferably nytrogen atmosphere.

The present invention will be hereinafter explained in detail with reference to the Examples.

EXAMPLES

EXAMPLE 1

An alkoxide solution shown in Table 1 which has been synthesized by a known method and silicon oxynitride component powders indicated below were mixed while stirring in the ratios shown in Table 1.

A slurry obtained as described above was then hydrolized dropping distilled water while heating on a hot plate and stirring. While performing the hydrolysis, the solvent is removed by evaporation, and the slurry was dried by evaporation further continuing the heating and stirring.

The powder thus obtained was dried at a reduced pressure at 100° C. for 24 hours and then sintered under a pressure of 200 kgf/cm$^2$ to obtain sintered bodies of different sizes.

| SiO$_2$ powder: | |
|---|---|
| average particle size | 15 nm |
| purity | 99.9% |
| apparent specific gravity | about 50 g/l |
| colloidal silica | |
| SiO$_2$ content | 30% by weight |
| particle size | 10–20 nm |
| dispersion medium | iso-propanol |
| sodium oxide (Na$_2$O) content | not more than 0.04% |
| Si$_3$N$_4$ powder: | |
| average particle size | 0.6 μm |
| purity | 98% |
| α-fraction | 90% |
| Si$_2$N$_2$O powder: | |
| average particle size | 1 μm |
| purity | 98% |

As solvents for alkoxide solutions, tetrahydrofuran and iso-propanol were used for Sample Nos. A-1 to A-4, and Sample Nos. A-5 to A-8 and B-1 to B-3, respectively, in an appropriate amount so that homogeneous slurries could be obtained.

It is to be noted that, in Table 1, compositional amounts of alkoxides are those converted into oxides of metals, and compositional amounts of the colloidal silica are those calculated on SiO$_2$.

Sintered bodies obtained as described above were cut out by a grinding wheel and polished into dimensions of 4 mm × 3 mm × 40 mm to obtain specimens for measurement.

The flexural strength (conforming to JIS-R1601 and JIS-R1604) of the specimens at room temperature and 1200° C. were then measured. The results are shown in Table 1. Crystal phases within the specimens were also identified by X-ray diffraction. The results are also shown in Table 1.

As comparative examples, any of metal oxides having an average particle size of no larger than 2 μm was added to Si$_2$N$_2$O powder or a mixed powder of Si$_3$N$_4$ and SiO$_2$, and the resultant mixtures were wet blended by a ball mill in ethanol for 16 hours and dried to obtain respective powders, which were sintered by hot pressing under the same conditions as those in the above-described embodiment to obtain sintered bodies.

The same tests as those described above were performed for these sintered bodies. The results are shown as Sample Nos. D-1 to D-6 in Table 1.

In inventive examples in Table 1, Si$_2$N$_2$O forms a major phase. The term "major phase" is defined by the following conditions:

(i) The highest X-ray diffraction spectra intensity peak (referred to as "X-ray intensity peak") of $Si_2N_2O$ ((200) or (111)) is no less than ½ of the highest X-ray intensity peak of compounds other than $Si_2N_2O$ and whiskers (SiC and $\beta$-$Si_3N_4$), and (ii) The volume of $Si_2N_2O$ crystal grains occupies at least 50% of the entire sintered body except for whiskers (SiC and $\beta$-$Si_3N_4$).

From Table 1, it becomes apparent that, when the alkoxides are used as a starting raw material, the flexural strength is significantly improved and there is no or reduced deterioration in the high-temperature flexural strength, compared with a case where a usual metal oxide (powder) sintering aid is used.

EXAMPLE 2

An alkoxide solution shown in Table 2 which has been synthesized by a known method and whiskers and silicon oxynitride component powders indicated below were mixed in the ratios shown in Table 2, and the resultant mixtures were wet blended by a ball mill for 16 hours, respectively.

The slurries obtained as described above were hydrolized dropping distilled water while heating and stirring. While performing the hydrolysis, the solvent was removed by evaporation, and the slurries were dried by evaporation further continuing the heating and stirring, respectively.

The powders thus obtained were dried in a reduced pressure at 100° C. for 24 hours, and calcined at 600° C. for 24 hours to obtain base powders.

The base powders thus obtained were sintered by hot pressing at any of the temperatures shown in Table 2 for 4 hours under a pressure of 200 kgf/cm$^2$.
$SiO_2$ powder:
colloidal silica:
$Si_3N_4$ powder:
$Si_2N_2O$ power:
The figures for these powders were the same as those in Example 1.

| SiC whiskers: | |
|---|---|
| average diameter | 0.6 μm |
| length | 10–80 μm |
| $\beta$-type $Si_3N_4$ whiskers: | |
| average diameter | 1 μm |
| length | 5–50 μm |

As the solvents for alkoxide solutions, tetrahydrofuran and iso-propanol were used for Sample Nos. A-9 to A-14 and D-8 to D-13 and Sample Nos. A-15 to A-17 and B-4 to B-6, respectively.

It is to be noted that, in Table 2, the compositional amounts of alkoxides are those converted into oxides of metals, and the compositional amounts of colloidal silica are those calculated on $SiO_2$.

The sintered bodies obtained as described above were cut out by a grinding wheel and polished into dimensions of 4 mm×3 mm×40 mm to obtain specimens for measurement.

The flexural strength (conforming to JIS-R1601 and JIS-R1604) at room temperature and 1000° C., Vickers hardness (load: 10 kgf) and fracture toughness (by the indentation microfracture method with a load of 10 kgf) of the specimens were then measured. The results are shown in Table 2. Crystal phases within the specimens were identified using X-ray diffractiometry. The results are also shown in Table 2.

From the results of observations of the specimens by an electron microscope (SEM), and X-ray diffractiometry, it was confirmed that SiC whiskers and/or $\beta$-type $Si_3N_4$ whiskers remain in the specimens in the form of whiskers without chemically reacting with other components, and are also uniformly dispersed over the entire sintered body.

In Sample Nos. D-14 to D-17 of the comparative samples, any one of metal oxides having an average particle size of no larger than 2 μm was added to $Si_2N_2O$ powder or a mixture powder of $Si_3N_4$ and $SiO_2$, the resultant mixtures were wet blended by a ball mill in ethanol for 16 hours, respectively, and dried to obtain powders, which were sintered by hot pressing under the same conditions as those in the above-described embodiment to prepare sintered bodies. The identical measurements as those described above were also performed on these specimens. The results are shown in Table 2.

In the inventive examples in Table 2, a major phase within a sintered base body exclusive of whiskers is $Si_2N_2O$. An oxide phase (originated from alkoxides) forms a bond matrix phase. In most (all) samples, the bond matrix forms a continuous net work. Whiskers are surrounded by the bond matrix.

From Table 2, it has turned out evident that, when alkoxides are used as a starting material, and even if whiskers are used together, the flexural strength is remarkably improved and there is no deterioration in the high-temperature flexural strength, compared with a case in which the powdery metal oxide sintering aid is used.

Moreover, it has also become evident that, by means of using whiskers together with the alkoxide as a starting material, the toughness of a sintered body obtained is largely improved.

Additionally to above measurements as mentioned at Examples 1 and 2, the Weibull modulus (m) was measured on certain samples (more than 20) of the sintered bodies (with or without whiskers) and found 20 or more which stand very high compared to the conventional silicon oxynitride sintered bodies (comparative samples) showing a Weibull modulus less than 20.

Modification obvious in the art may be done without departing from the gist and concept of the present invention as hereinabove disclosed and claimed hereinbelow.

TABLE 1

| Sample No. | Composition (wt %) | | | | | | Properties of sintered body | | |
|---|---|---|---|---|---|---|---|---|---|
| | Silicon oxynitride component | | | Sintering aid | | | Flexural strength*2 | | Crystal phases in sintered body |
| | $Si_2N_2O$ | $Si_3N_4$ | $SiO_2$ | alkoxide | as oxide | metal oxide | R.T. | 1200° C. | |
| Inventive examples | | | | | | | | | |
| A-1 | — | 67.7 | 29.0 | Y{OCH(CH$_3$)$_2$}$_3$ | 3.3 | — | 75 | 79 | $Si_2N_2O$ |
| A-2 | — | 66.3 | 28.4 | Y{OCH(CH$_3$)$_2$}$_3$ | 5.3 | — | 76 | 74 | $Si_2N_2O$ |
| A-3 | — | 63.0 | 29.7 | La{OCH(CH$_3$)$_2$}$_3$ | 7.3 | — | 70 | 63 | $Si_2N_2O$ |

TABLE 1-continued

| Sample No. | Composition (wt %) | | | | | | | Properties of sintered body | | Crystal phases in sintered body |
|---|---|---|---|---|---|---|---|---|---|---|
| | Silicon oxynitride component | | | Sintering aid | | | | Flexural strength*2 | | |
| | $Si_2N_2O$ | $Si_3N_4$ | $SiO_2$ | alkoxide | | as oxide | metal oxide | R.T. | 1200° C. | |
| A-4 | — | 57.4 | 24.6 | La{OCH($CH_3)_2\}_3$ | 18.0 | — | — | 74 | 60 | $Si_2N_2O$, U.K |
| A-5 | — | 71.6 | 27.9 | Al{OCH($CH_3)_2\}_3$ | 0.5 | — | — | 69 | 68 | $Si_2N_2O$, α-$Si_3N_4$ |
| A-6 | — | 66.9 | 28.6 | Sc{OCH($CH_3)_2\}_3$ | 4.5 | — | — | 68 | 67 | $Si_2N_2O$ |
| A-7 | 90.8 | — | — | Yb{OCH($CH_3)_2\}_3$ | 9.2 | — | — | 80 | 73 | $Si_2N_2O$, U.K |
| A-8 | 88.6 | — | — | Nd{OCH($CH_3)_2\}_3$ | 11.4 | — | — | 72 | 66 | $Si_2N_2O$, U.K |
| B-1 | — | 69.3 | 29.7*1 | Al(OCH$_2CH_3)_3$ | 1.0 | — | — | 73 | 73 | $Si_2N_2O$ |
| B-2 | — | 68.0 | 30.6*1 | Al(OCH$_2CH_3)_3$ | 1.4 | — | — | 72 | 67 | $Si_2N_2O$ |
| B-3 | — | 69.2 | 29.7*1 | Y(OCH$_2CH_3)_3$ | 1.1 | — | — | 80 | 81 | $Si_2N_2O$ |
| Comparative examples | | | | | | | | | | |
| D-1 | 92.0 | — | — | — | — | $Sm_2O_3$ | 8.0 | 37 | 27 | $Si_2N_2O$ |
| D-2 | — | 64.4 | 27.6 | — | — | $Sm_2O_3$ | 8.0 | 42 | 30 | $Si_2N_2O$, α-$Si_3N_4$ |
| D-3 | 99.5 | — | — | — | — | $Y_2O_3$ | 0.5 | not densified*4 | | |
| D-4 | 95.0 | — | — | — | — | $Al_2O_3$ | 5.0 | 32 | 38 | $Si_2N_2O$ |
| D-5 | 79.9 | — | — | — | — | $La_2O_3$ | 20.1 | 51 | 22 | $Si_2N_2O$, U.K |
| D-6 | — | 65.4 | 28.0 | — | — | $Sc_2O_3$ | 6.6 | 24 | 27 | $Si_2N_2O$ |

Note
*1 Colloidal silica was used as $SiO_2$
*2 The unit of flexural strength in properties of sintered bodies is (kg/mm$^2$)
*3 U.K. indicates "unknown crystal phase"
*4 <95% of the theoretical density

TABLE 2

| Sample No. | Composition (wt %) | | | | | | | Sintering temperature (°C.) |
|---|---|---|---|---|---|---|---|---|
| | Silicon oxynitride component | | | Sintering aid | | Whiskers | | |
| | $Si_2N_2O$ | $Si_3N_4$ | $SiO_2$ | | as oxide | | | |
| Inventive examples | | | | | | | | |
| A-9 | — | 58.9 | 25.2 | Al{OCH($CH_3)_2\}_3$ | 0.9 | SiC | 15 | 1780 |
| A-10 | — | 52.6 | 20.5 | Al{OCH($CH_3)_2\}_3$ | 1.9 | SiC | 25 | 1800 |
| A-11 | — | 29.5 | 13.3 | Y{OCH($CH_3)_2\}_3$ | 20.2 | SiC | 37 | 1800 |
| A-12 | — | 48.7 | 20.9 | Y{OCH($CH_3)_2\}_3$ | 10.4 | SiC | 20 | 1750 |
| A-13 | — | 57.6 | 24.7 | La{OCH($CH_3)_2\}_3$ | 9.7 | SiC | 8 | 1750 |
| A-14 | — | 61.7 | 26.5 | Al{OCH($CH_3)_2\}_3$ | 1.8 | β-$Si_3N_4$ | 10 | 1750 |
| A-15 | — | 56.1 | 24.0 | Y{OCH($CH_3)_2\}_3$ | 4.9 | β-$Si_3N_4$ | 15 | 1750 |
| A-16 | 70.5 | — | — | Sc{OCH($CH_3)_2\}_3$ | 6.5 | β-$Si_3N_4$ | 23 | 1780 |
| A-17 | 74.4 | — | — | Yb{OCH($CH_3)_2\}_3$ | 7.6 | SiC | 18 | 1780 |
| B-4 | — | 62.2 | 26.6*5 | Al(OCH$_2CH_3)_3$ | 1.2 | SiC | 10 | 1800 |
| B-5 | — | 56.4 | 26.6*5 | Al(OCH$_2CH_3)_3$ | 2.0 | SiC | 15 | 1800 |
| B-6 | — | 62.6 | 26.6*5 | Sc(OCH$_2CH_3)_3$ | 0.6 | SiC | 10 | 1750 |
| Comparative examples | | | | | | | | |
| D-7 | — | 70.0 | 30.0 | — | | — | | 1750 |
| D-8 | — | 66.5 | 28.5 | Y{OCH($CH_3)_2\}_3$ | 5.0 | — | | 1750 |
| D-9 | — | 64.4 | 27.6 | Y{OCH($CH_3)_2\}_3$ | 5.0 | SiC | 3 | 1750 |
| D-10 | — | 35.0 | 15.0 | Y{OCH($CH_3)_2\}_3$ | 5.0 | SiC | 45 | 1750 |
| D-11 | — | 59.5 | 25.0 | — | | SiC | 15 | 1750 |
| D-12 | — | 59.4 | 25.5 | La{OCH($CH_3)_2\}_3$ | 0.1 | SiC | 15 | 1750 |
| D-13 | — | 31.5 | 13.5 | La{OCH($CH_3)_2\}_3$ | 40.0 | SiC | 15 | 1750 |
| D-14 | — | 64.4 | 27.6 | $Sm_2O_3$ | 8.0 | — | | 1680 |
| D-15 | 92.0 | — | — | $Sm_2O_3$ | 8.0 | — | | 1680 |
| D-16 | 95.0 | — | — | $Al_2O_3$ | 5.0 | — | | 1680 |
| D-17 | 79.9 | — | — | $La_2O_3$ | 20.1 | — | | 1680 |

| Sample No. | Properties of sintered body | | | | |
|---|---|---|---|---|---|
| | Flexural Strength*2 | | Fracture*3 toughness | Hv*6 (kgf/mm$^2$) | Crystal phases in sintered body*4 |
| | R.T. | 1200° C. | | | |
| A-9 | 78 | 81 | 7.6 | 1790 | $Si_2N_2O$,SiC |
| A-10 | 85 | 89 | 8.2 | 1830 | $Si_2N_2O$,SiC,β-$Si_3N_4$ |
| A-11 | 95 | 81 | 8.7 | 1820 | $Si_2N_2O$,SiC,$Y_2Si_2O_7$,U.K. |
| A-12 | 94 | 90 | 7.4 | 1820 | $Si_2N_2O$,SiC,$Y_2Si_2O_7$,U.K. |
| A-13 | 69 | 63 | 6.2 | 1710 | $Si_2N_2O$,SiC |
| A-14 | 65 | 66 | 6.8 | 1680 | $Si_2N_2O$,β-$Si_3N_4$ |
| A-15 | 70 | 68 | 7.1 | 1700 | $Si_2N_2O$,β-$Si_3N_4$ |
| A-16 | 76 | 82 | 7.7 | 1730 | $Si_2N_2O$,β-$Si_3N_4$ |
| A-17 | 89 | 91 | 7.9 | 1780 | $Si_2N_2O$,SiC |
| B-4 | 72 | 72 | 7.2 | 1720 | $Si_2N_2O$,SiC |
| B-5 | 78 | 76 | 7.6 | 1760 | $Si_2N_2O$,SiC |
| B-6 | 69 | 74 | 7.4 | 1720 | $Si_2N_2O$,SiC |
| D-7 | decomposed and volatilized | | | | |
| D-8 | decomposed and volatilized | | | | |

TABLE 2-continued

| | | | | | |
|---|---|---|---|---|---|
| D-9 | | decomposed and volatilized | | | |
| D-10 | | not densified[*7] | | | |
| D-11 | | not densified | | | |
| D-12 | | not densified | | | |
| D-13 | 65 | 20 | 6.3 | 1450 | $Si_2N_2O, SiC, U.K.$ |
| D-14 | 42 | 30 | 2.8 | 1420 | $Si_2N_2O, \alpha\text{-}Si_3N_4$ |
| D-15 | 37 | 27 | 3.2 | 1440 | $Si_2N_2O$ |
| D-16 | 32 | 38 | 2.7 | 1430 | $Si_2N_2O$ |
| D-17 | 51 | 22 | 2.9 | 1390 | $Si_2N_2O, U.K.$ |

[*1] Composition amounts of sintering aids are converted into oxides
[*2] The unit of flexural strength in properties of sintered bodies is ($kgf/mm^2$)
[*3] The unit of fracture toughness in properties of sintered bodies is ($MN/m^{3/2}$)
[*4] U.K. indicates "unknown crystal phase"
[*5] Colloidal silica was used as $SiO_2$
[*6] Hv = Vickers hardness
[*7] <95% of the theoretical density

What is claimed is:

1. A fiber-reinforced silicon oxynitride ceramic sintered body obtained by sintering a starting material consisting essentially of:
   (a) at least one of SiC whiskers and $\beta$-$Si_3N_4$ whiskers;
   (b) at least one alkoxide selected from alkoxides of at least one element selected from the group consisting of Al, Sc, Y and rare-earth elements; and
   (c) a silicon oxynitride component,
   wherein component (a) is 5–40% by weight, component (b) is 0.5–30% by weight converted into oxides of said elements, and the balance is component (c).

2. A sintered body as set forth in claim 1, wherein said alkoxide is formed of a lower alcohol of not more than 4 carbon atoms.

3. A sintered body as set forth in claim 1, wherein the content of oxides originating from the alkoxides is 0.1–30% by weight.

4. A sintered body as set forth in claim 1, wherein the content of oxides originating from the alkoxides is 0.1–20% by weight.

5. A sintered body as set forth in claim 1, wherein the content of oxides originating from the alkoxide is 0.5–30% by weight.

6. A sintered body as set forth in claim 2, wherein the sintered body comprises a silicon oxynitride phase present predominantly as $Si_2N_2O$.

7. A sintered body as set forth in claim 1, wherein oxides originating from the alkoxides are present in the sintered body as a bond matrix.

8. A sintered body as set forth in claim 7, wherein said bond matrix forms a continuous network phase.

9. A sintered body as set forth in claim 1, wherein the silicon oxynitride component is $Si_2N_2O$, a mixture of $Si_3N_4$ and $SiO_2$, or mixtures thereof.

10. A sintered body as set forth in claim 1, wherein the silicon oxynitride component comprises a mixture of $Si_3N_4$ and $SiO_2$ at a ratio of $Si_3N_4$ to $SiO_2$ within a range between 1.4:1.0 and 1.0:1.2.

11. A sintered body as set forth in claim 1, wherein the silicon oxynitride component comprises a mixture of $Si_3N_4$ and $SiO_2$ at a ratio of $Si_3N_4$ to $SiO_2$ within a range between 1.2:1.0 and 1.0:1.2.

12. A sintered body as set forth in claim 1, wherein a part of the silicon oxynitride component is $SiO_2$ originating from colloidal silica.

13. A sintered body as set forth in claim 1, wherein the whiskers have an average diameter of 0.2–5 μm and an average length of 2–200 μm.

14. A sintered body as set forth in claim 1 or 2, wherein the ratio of flexural strength at 1200° C. to that at room temperature is not less than 80%.

15. A sintered body as set forth in claim 1 or 2, wherein the ratio of flexural strength at 1200° C. to that at room temperature is not less than 90%.

16. A sintered body as set forth in claim 1 or 2, wherein the ratio of flexural strength at 1200° C. to that at room temperature is not less than 93%.

17. A sintered body as set forth in claim 2, wherein a flexural strength at 1200° C. is not less than 60 $kgf/mm^2$.

18. A sintered body as set forth in claim 2, wherein the flexural strength at 1200° C. is not less than 63 $kgf/mm^2$.

* * * * *